R. M. JACKSON.
Seed-Planter.
No. 9,298.  Patented Oct. 5, 1852.
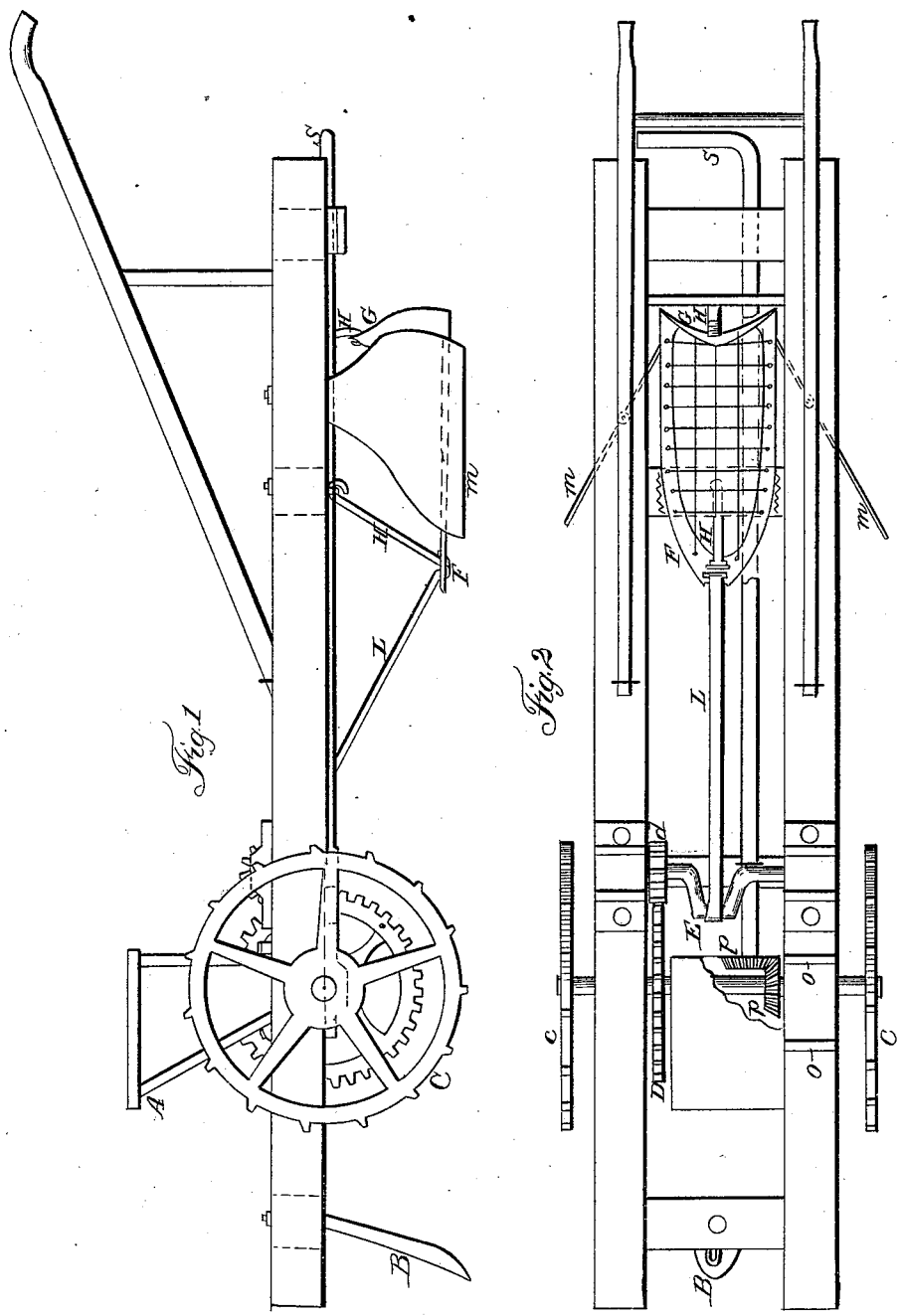

UNITED STATES PATENT OFFICE.

ROBT. M. JACKSON, OF PENNINGTONVILLE, PENNSYLVANIA.

IMPROVEMENT IN SEED-PLANTERS.

Specification forming part of Letters Patent No. 9,298, dated October 5, 1852.

*To all whom it may concern:*

Be it known that I, ROBERT M. JACKSON, of Penningtonville, in the county of Chester and State of Pennsylvania, have invented a new and useful Improvement in Corn-Planters; and I do hereby declare that the following is a full, clear, and exact description of the construction and operation of the same, reference being had to the annexed drawings, making a part of this specification, in which—

Figure 1 is a side view, and Fig. 2 a top view, the same letters referring to like parts in both drawings.

The nature of my invention consists in applying a sieve to the machine, which will deposit the fine earth upon the grain and throw the coarser parts to each side, and a marking-rod by which corn may be planted to be in rows across as well as lengthwise.

To enable others to make and use my invention, I will proceed to describe its construction and operation.

I construct an ordinary frame, having a shovel-tooth, B, in the front end of a sufficient length and width to make a furrow. The front part of the machine is carried by two wheels, C, the shaft of which drops corn once every revolution into the furrow from the box A on the top in the usual manner. I gear two cog-wheels, D d, together, (the larger fast on the axle which revolves,) which wheels give motion to the crank-arm E. I then have a riddle or sieve, F, for the purpose of sifting the pulverized earth upon the corn, with an upright piece, G, on the hinder end to keep the coarse parts from falling upon the grain and obstructing it in sprouting up. The sieve F is suspended, near the ground, to the frame by the rods H H, and over the furrow which the tooth B has made and in which the corn is dropped. The front end of said sieve being attached by the rod L to the crank-arm E, it gives it a vibratory motion as it revolves. The plows *m* throw the earth upon the sieve, and its motion shakes the fine earth through it upon the corn, the stones and coarser parts passing off behind the plows to each side, the upright piece G preventing them from falling upon the row. I also have two miter-wheels, P P, geared together, connecting with the axle, making the rod S revolve as the machine is drawn forward, marking each place where corn is dropped, by observing which the grain in every subsequent row may be deposited directly opposite the places it was dropped in the first, and thus have it in rows across, so that it can be worked with the cultivator and plow both ways, as when planted with the hand-hoe.

What I claim as my invention, and desire to secure by Letters Patent, is—

The corn-planter sieve and its appendages, for the purpose of sifting and depositing the fine earth upon the grain and throwing off stones and such matter as would obstruct the young sprout in coming through the ground, substantially as described and illustrated herein.

ROBT. M. JACKSON.

Witnesses:
J. A. MORRISON,
JOS. McGUIGAN.